US012584460B2

(12) United States Patent
Botwright

(10) Patent No.: US 12,584,460 B2
(45) Date of Patent: Mar. 24, 2026

(54) METHOD FOR LIFTING OR LOWERING COMPONENTS TO OR FROM A LOCATION ON AN OFF-SHORE WIND TURBINE GENERATOR AND HANDSHAKE-TOOL FOR USE IN THE METHOD

(71) Applicant: Vestas Wind Systems A/S, Aarhus N (DK)

(72) Inventor: Adrian Botwright, Sabro (DK)

(73) Assignee: Vestas Wind Systems A/S, Aarhus N. (DK)

( * ) Notice: Subject to any disclaimer, the term of this patent is extended or adjusted under 35 U.S.C. 154(b) by 191 days.

(21) Appl. No.: 18/270,279

(22) PCT Filed: Oct. 4, 2021

(86) PCT No.: PCT/DK2021/050304
§ 371 (c)(1),
(2) Date: Jun. 29, 2023

(87) PCT Pub. No.: WO2022/144061
PCT Pub. Date: Jul. 7, 2022

(65) Prior Publication Data
US 2024/0309848 A1 Sep. 19, 2024

(30) Foreign Application Priority Data

Jan. 4, 2021 (EP) ..................................... 21150058

(51) Int. Cl.
*F03D 13/10* (2016.01)
*B66C 1/10* (2006.01)
(Continued)

(52) U.S. Cl.
CPC ............ *F03D 13/126* (2023.08); *B66C 1/108* (2013.01); *B66C 23/207* (2013.01); *B66C 23/52* (2013.01);
(Continued)

(58) Field of Classification Search
CPC ...... F03D 13/126; F03D 13/139; F03D 13/10; F05B 2230/61; B66C 23/207;
(Continued)

(56) References Cited

U.S. PATENT DOCUMENTS 1,567,719 A * 12/1925 Erlandsen ................. B66C 1/00
294/82.11
1,714,768 A * 5/1929 Ferry ...................... F16G 11/00
59/95
(Continued)

FOREIGN PATENT DOCUMENTS

DE 102007027746 A1 12/2008
WO WO-2012142686 A1 * 10/2012 ............. F16G 15/06
(Continued)

OTHER PUBLICATIONS

Anonymous, "Lifting a beam by Mammoet: www.trucks-cranes.nl", Jul. 28, 2016, XP055818911, retrieved from internet on Jun. 28, 2021 per search report.

(Continued)

*Primary Examiner* — Anna M Momper
*Assistant Examiner* — Juan J Campos, Jr.
(74) *Attorney, Agent, or Firm* — Wood Herron & Evans LLP

(57) ABSTRACT

In order to allow for a safe and cost-efficient lifting of components (1) from a service vessel (2) to a location on an off-shore wind turbine generator (3) or lowering of components from a location on an off-shore wind turbine generator to a service vessel a method involving the use of a handshake-tool (10) is provided my means of which the component to be lifted or lowered can easily be transferred from one crane to another.

13 Claims, 4 Drawing Sheets

(A)　　　　(B)　　　　(C)　　　　(D)

Figures 1, 2, 2A:
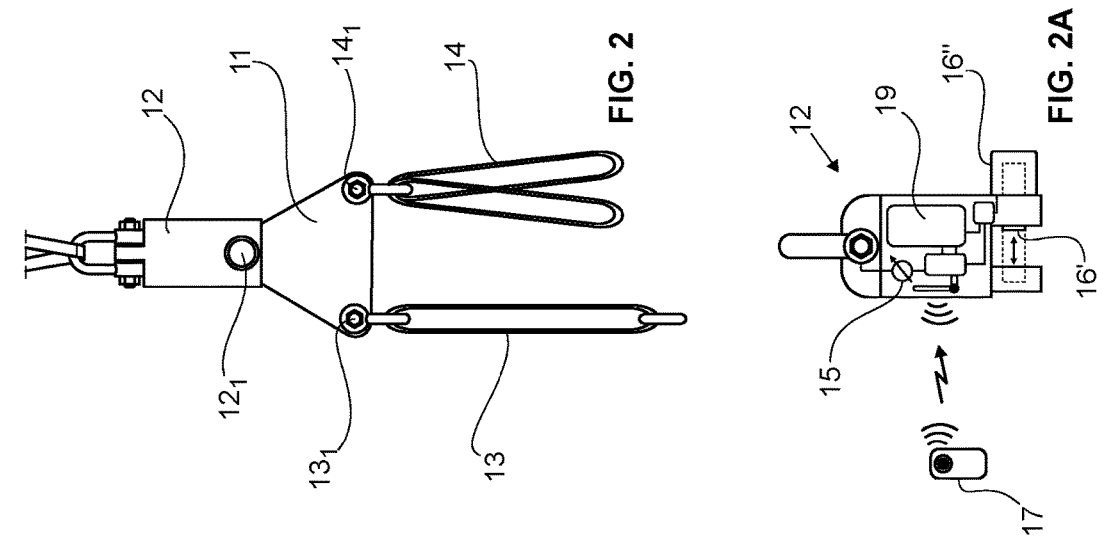

(51) Int. Cl.
  *B66C 23/20*        (2006.01)
  *B66C 23/52*        (2006.01)
(52) U.S. Cl.
  CPC ........ *F03D 13/139* (2023.08); *F05B 2230/61*
                       (2013.01)
(58) Field of Classification Search
  CPC ....... B66C 23/52; B66C 23/185; B66C 1/108;
                  B66C 1/38; B66C 1/00; B66C 1/10
  USPC .................................. 294/81.62, 89, 74, 82.1
  See application file for complete search history.

(56)                References Cited

U.S. PATENT DOCUMENTS

| | | | | |
|---|---|---|---|---|
| 2,139,294 | A * | 12/1938 | Weigant | F16G 15/08 |
| | | | | 212/253 |
| 2,346,277 | A * | 4/1944 | Sherman | B66C 1/00 |
| | | | | 294/82.1 |
| 2,941,674 | A * | 6/1960 | Bille | B63B 27/04 |
| | | | | 212/311 |
| 3,730,484 | A | 5/1973 | Fairbanks | |
| 8,544,912 | B1 * | 10/2013 | Matthews | B66C 1/12 |
| | | | | 294/74 |
| 8,905,448 | B2 * | 12/2014 | Vaz Coelho | F16G 15/00 |
| | | | | 294/82.11 |
| 9,802,796 | B2 * | 10/2017 | Li | B66C 23/18 |

| | | | | |
|---|---|---|---|---|
| 11,174,136 | B2 * | 11/2021 | Pubanz | F03D 13/10 |
| 2004/0207221 | A1 * | 10/2004 | Hockenhull | F16G 15/00 |
| | | | | 294/82.1 |
| 2007/0222243 | A1 * | 9/2007 | Molaug | F16B 45/021 |
| | | | | 294/82.3 |
| 2018/0347549 | A1 | 12/2018 | Huot et al. | |
| 2020/0024110 | A1 * | 1/2020 | Pubanz | F03D 13/20 |

FOREIGN PATENT DOCUMENTS

| | | | |
|---|---|---|---|
| WO | 2015003733 | A1 | 1/2015 |
| WO | 2018185111 | A1 | 10/2018 |
| WO | 2019166066 | A1 | 9/2019 |

OTHER PUBLICATIONS

European Patent Office, extended European Search Report issued in corresponding EP Application No. 21150058.2, dated Jul. 14, 2021.
International Searching Authority, International Search Report and Written Opinion issued in corresponding PCT Application No. PCT/DK20218050304, mailed Feb. 10, 2022.
European Patent Office, observations by a third party filed in corresponding EP Application No. 21786083.2, dated Dec. 4, 2025.
European Patent Office, observations by a third party filed in corresponding EP Application No. 21786083.2, dated Dec. 5, 2025.
European Patent Office, observations by a third party filed in corresponding EP Application No. 21786083.2, dated Jan. 16, 2026.

* cited by examiner

METHOD FOR LIFTING OR LOWERING COMPONENTS TO OR FROM A LOCATION ON AN OFF-SHORE WIND TURBINE GENERATOR AND HANDSHAKE-TOOL FOR USE IN THE METHOD

The invention relates to a method for lifting components from a location on a service vessel to a location on an off-shore wind turbine generator (WTG) and/or for lowering components from a location on the off-shore wind turbine generator (WTG) to a location on the service vessel. The method is making use of at least a service vessel bound lifting apparatus and a wind turbine generator bound lifting apparatus and includes a transfer step during which the component is detached from the one of the lifting apparatuses being a primary lifting apparatus and is attached the other one of the lifting apparatuses being a secondary lifting apparatus. The invention further relates to a handshake-tool as special rigging equipment used for the mentioned method.

The operation of off-shore wind turbine generators (WTG) does not only require initial installment of the WTG at its off-shore location but also requires maintenance and repair work over its lifetime which again may require the exchange and replacement of components and the lifting or lowering of components to or from the nacelle from or to a service vessel.

Particularly, the exchange of up-tower main components located in a nacelle of a wind turbine requires lowering the up-tower component to be replaced from the nacelle onto a service vessel after deinstallation of the component and lifting into the nacelle a replacement component. Components to be lifted or lowered to or from an up-tower location on the WTG may also include maintenance equipment and tooling or any other equipment to be at least temporarily installed at an up-tower location for the duration of the maintenance or repair procedure. For example, certain maintenance or component exchange procedures may not only require to lower or lift replacement components as such, but may also require the temporary installment of auxiliary equipment such as lifting apparatuses, for example additional heavy-duty cranes or winches with which the WTG is not permanently equipped. This is also true for the claimed invention such that the term "component" should be understood in a broad sense to cover anything that might need to be lifted or lowered to or from an up-tower location of the WTG, in particular to or from the nacelle.

Obviously, when a component is to be lifted from the service vessel to an up-tower location on the WTG or to be lowered from an up-tower location on the WTG to the service vessel by means of at least two separate lifting apparatuses, one being located on the service vessel and the other one being located on the WTG, the component to be moved from one location to the other will need to be transferred from one lifting apparatus to the other during the procedure. In both cases and depending on the direction of movement of the component either from the service vessel to the WTG or from the WTG to the service vessel a transfer step during which the component is detached from the lifting apparatus being first in line (the primary lifting apparatus) and is subsequently attached to the lifting apparatus being second in line (the secondary lifting apparatus) is necessary.

For lifting components to an up-tower location of the WTG, in particular up to the nacelle, a component brought to the WTG off-shore location by the service vessel will first need to be attached to a rigging of a service vessel bound lifting apparatus and will then need to be lifted from the service vessel into a position in which the component can be reached by the WTG bound lifting apparatus. Subsequently, the component will need to be detached from the service vessel bound lifting apparatus and attached to the WTG bound lifting apparatus. In this case the service vessel bound lifting apparatus is a primary lifting apparatus and the WTG bound lifting apparatus is the secondary lifting apparatus.

For lowering a component from an up-tower location of the WTG, in particular from the nacelle, a component will first be attached to a rigging of the WTG bound lifting apparatus and will then be lowered into a position in which the component can be reached by the service vessel bound lifting apparatus. Subsequently, the component will need to be detached from the WTG bound lifting apparatus and attached to the service vessel bound lifting apparatus. In this case the WTG bound lifting apparatus is a primary lifting apparatus and the service vessel bound lifting apparatus is the secondary lifting apparatus.

The transfer step during which the component is changing the lifting apparatus to which it is attached by detaching the component from the primary lifting apparatus and then attaching it to the secondary lifting apparatus may be time consuming. It requires not only changing the lifting apparatus but also temporarily setting down the component on a WTG structure, for example on a service platform. Taking into consideration the potential weight of the components (a generator may weigh about 30 tons and a gearbox may weigh about 70 tons) setting down the component on a structure of the WTG requires not only great care but will also require the respective WTG structure to be strong enough to hold the component.

As an alternative to performing the transfer step as described above it is of course possible and also known in the art to use large jack-up service vessels equipped with lifting apparatuses such as cranes that are capable to reach also an up-tower location on the WTG such that a secondary WTG bound lifting apparatus is not needed. However, the operation of such a large jack-up service vessel is very costly and making the vessel ready to operate at the WTG site can require a lot of time and personnel. Also, a potential non-availability of such a large vessel over a longer period of time may cause costly downtimes of the wind turbine. It would therefore be advantageous if at least for repair and/or maintenance work small service vessels which grant a higher degree of flexibility and availability could be used.

It is an object of the invention to create an efficient procedure allowing the lifting of components from a service vessel to a location on the WTG or the lowering of components from a location on the WTG to a service vessel, the location on the WTG preferably being an up-tower location. The new method should be less time consuming and less costly. It should furthermore allow a safe handling of components. In addition, the method should ideally allow the design of a WTG tower that does not necessarily have to provide a service platform with a load capacity high enough to carry even main components such as gearboxes or generators as this will reduce costs for production, transport and installation of the WTG.

In view of these objects, the invention provides for a method in which the component is attached to the rigging of the primary lifting apparatus via a handshake-tool and in that the transfer step is performed by attaching the component to the rigging of the secondary lifting apparatus via the handshake-tool prior to the component being detached from the primary lifting apparatus.

The invention further provides for a handshake-tool for the use in such a method, the handshake-tool providing first load engagement structure to which the primary lifting apparatus may be connected to, a second load engagement structure to which the secondary lifting apparatus may be connected to, and a third load engagement structure to which the component may be attached, wherein at least the first load engagement structure comprises a remotely activatable release mechanism.

The handshake-tool allows for an efficient "handing over" of the component from the primary lifting apparatus to the secondary lifting apparatus. During this "handshake" between the primary and the secondary lifting apparatus the component will not have to set down on a WTG structure for detachment of the component from the primary lifting apparatus and its subsequent attachment to the secondary lifting apparatus. The secondary lifting apparatus may be attached to the handshake-tool via the second load engagement structure while the component is still attached to the primary lifting apparatus and even if the component is still in the air. Even if the component is temporarily set down, the "handing over" from the primary to the secondary lifting apparatus may be performed quicker and safer since the component and thereby its load may remain attached to and secured by the primary lifting apparatus during the "handshake" and will at no time be disconnected from both the primary and secondary lifting apparatus until put in place at the up-tower location or on the service vessel. The use of a remotely activatable release mechanism at the first engagement structure also allows for a quick and secure detachment of the component from the primary lifting apparatus.

Preferably, the component is not detached from the primary lifting apparatus prior to the load of the component having been taken over by the secondary lifting apparatus at least up to a release threshold. In other words, the release mechanism is only activated if the load of the component-whilst the component being attached to both the primary and the secondary lifting apparatus—has been "handed over" from the primary lifting apparatus to the secondary lifting apparatus at least up to an extent that allows the safe release of the component from the primary lifting apparatus. Typically, the component will be detached from the primary lifting apparatus only if the load has been fully taken over by the secondary lifting apparatus. This state can easily be recognized by personnel supervising the transfer step through for example watching the rigging of the primary lifting apparatus, in particular cables of a crane, becoming slack. In addition, and as will become apparent further below, the design of the handshake-tool will also enhance visual recognizability of the completion of the load transfer from the primary to the secondary lifting apparatus.

As mentioned above the handshake-tool includes a remotely activatable release mechanism which is to be activated for releasing the component from the primary lifting apparatus during the transfer step. The remotely activatable release mechanism preferably is incorporated in a remote shackle but may more generally be incorporated in any engagement structure with sufficient load capacity to carry the needed load and capable of engaging with another object by means of a remotely controllable engagement element.

In order to make sure that the connection between the component and the primary lifting apparatus is not accidently released the rigging of the primary lifting apparatus, the handshake-tool or the engagement structure into which the remotely controllable release mechanism is incorporated in, in particular the remote shackle itself, may include a load sensing mechanism allowing the activation of the release mechanism and thereby the release by "opening" the remotely controllable engagement element only if the load detected by the load sensing mechanism, particularly the load acting on the remote shackle via the engagement element, is below a release threshold. The release threshold should be pre-defined and can be equal or close to zero such that the release mechanism will only open once the primary lifting apparatus is substantially load free.

The remotely controllable release mechanism is preferably radio controlled. However, the remotely controllable release mechanism may alternatively or in addition be controlled by a system that is to be activated manually by a person and that is reachable by a person at least when the component has been lifted or lowered into the transfer position. Such a system may provide for a cable or rope which can be grabbed by personnel standing on the WTG platform while the component is still connected to both the primary and secondary lifting apparatuses. The system can be designed such that for example a pull on the rope or cable will activate the remotely controllable release mechanism.

In order to provide energy needed to activate the remotely controllable release mechanism the engagement structure in which the remotely controllable release mechanism is incorporated in, the handshake-tool or the rigging of the primary lifting apparatus includes an energized system for providing the energy needed for a release of the component from the primary lifting apparatus. The energy may be electric, electro-magnetic, hydraulic, pneumatic or mechanical energy and the energized system may include a battery or accumulator, an electro-magnet, energy storage means for storing hydraulic or pneumatic energy or springs or other means capable of storing mechanical energy. Of course, a combination of two or more different kinds of storage means may also be used.

The method according to the invention alternatively allows for at least two ways of releasing the component from the primary lifting apparatus. In a first alternative the structure incorporating the remotely controllable release mechanism remains on the handshake-tool after having been activated for releasing the component from the primary lifting apparatus during the transfer step. If the method is performed in such a way then the engagement structure incorporating the remotely controllable release mechanism will stay connected to the handshake-tool and therefore with the secondary lifting apparatus. This procedure is preferable if the engagement structure incorporating the remotely controllable release mechanism will be needed at the location to which the secondary lifting apparatus transports the component. On the other hand, if after performing handshake the engagement structure is needed once again for the primary lifting apparatus, the engagement part incorporating the remotely controllable release mechanism can remain connected to the rigging of the primary lifting apparatus such that it can be used to connect to the next component to be lifted or lowered via another handshake-tool. It should be noted that it is of course possible to make use of a plurality of engagement structures and/or handshake tools during the procedure of lifting or lowering plurality of components to or from a location on the WTG.

For the sake of completeness, it should be noted that the wind turbine generator bound lifting apparatus may be a crane or winch permanently or temporarily installed on or inside a structure of the wind turbine generator, in particular on or in the nacelle, and/or that the service vessel bound lifting apparatus may be a vessel crane. Winches and cranes make use of steel cables as load bearing cables and these cables may serve as a secure indicator for the load having been fully handed over from the primary lifting apparatus to the secondary lifting apparatus due to the fact that the cables being slack can easily be visualized as a sign for the fact that the respective crane is substantially load free.

The handshake-tool used for the method preferably comprises a plate like load-transmitting structure for offering at least three load points with the at least three load points being in engagement with either the first, the second or the third load engagement structure. Most preferably the handshake-tool comprises a substantially triangular load plate with three load points near the corners. A plate like structure similar to what is also known in the technical field of marine shipping as a tow plate may be used.

The first load engagement structure and/or the second load engagement structure, particularly the load engagement structure not connected to the engagement structure incorporating the remotely controllable release mechanism, may comprise a sling such that the respective load engagement structure can easily be connected to the rigging of the respective lifting apparatus.

Various additional features and advantages of the invention will become more apparent to those of ordinary skill in art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention. In the accompanying drawings FIG. 1 depicts a service vessel with an on-vessel crane in the vicinity of an off-shore wind turbine generator during the process of lifting a component from the service vessel to an up-tower location on the WTG by means of both a vessel crane and a nacelle crane, FIG. 2 depicts a handshake-tool also used in FIG. 1 in detail, FIG. 2*a* details of a remote shackle being part of the handshake-tool in FIG. 2, FIG. 3 (A)-(D) shows details of different stages of the procedure of handing over the component from the vessel crane to the nacelle crane with the aid of the handshake-tool shown in FIG. 2 and FIG. 2*a*, FIG. 4 shows the removal of a main component out of the nacelle of the wind turbine generator, and FIG. 5 (A)-(E) illustrates details of the procedure of handing over the main component shown in FIG. 4 from the nacelle crane to the vessel crane by means of the handshake-tool shown in FIG. 2 and FIG. 2*a*.

FIG. 1 illustrates a first step in a procedure to lift a component 1 from a service vessel 2 to an up-tower location of an off-shore wind turbine generator 3 (WTG). The off-shore WTG 3 has a tower with a nacelle 4 on top of the tower to which the component 1 needs to be lifted.

FIG. 1 shows that the service vessel 2 is a relatively small jack-up vessel with an onboard vessel crane 6 as a vessel bound lifting apparatus. Other types of vessels may be used as well, for example permanently floating vessels with or without heave compensated vessel cranes. The height of the vessel crane 6 of the service vessel 2 is apparently too small to reach the top of the nacelle 4. It is one advantage of the invention that the invention allows for the use of smaller vessels which do not need to provide cranes or other lifting apparatuses that are capable of reaching the top of the nacelle. The use of such smaller vessels incurs significantly less costs, grants higher flexibility and minimizes the risk of non-availability.

On the nacelle 4 a nacelle crane 5 is installed as a WTG bound lifting apparatus. A nacelle crane 5 such as the one depicted in FIG. 1 will typically be permanently installed on the nacelle but will have only a rather limited load capacity. For lifting heavier components to the top of the nacelle, the load of which would exceed the load capacity of the permanently installed crane 5, components of additional temporary nacelle cranes with higher load capacity will first need to be lifted up to the nacelle. The component 1 depicted in FIG. 1 is a component of such an additional temporary nacelle crane. These additional temporary nacelle cranes will be installed temporarily, will then be used for lifting or lowering heavier components to or from the nacelle and will subsequently be deinstalled once the task for which they had been temporarily installed is completed. Such temporarily installed nacelle cranes 5' and 5" with higher load capacity compared to the permanently installed nacelle crane 5 are shown in FIG. 4. FIG. 4 shows the same WTG generator as FIG. 1 after installation of the temporary nacelle cranes 5' and 5". All of these nacelle cranes 5, 5' and 5" can serve as WTG bound lifting apparatuses in the context of the invention.

It is apparent from FIG. 1 that the component 1 which has been transported to the WTG site by means of the service vessel 2 will first be attached to the rigging of the vessel crane 6, will then be lifted off deck and will at some point during the procedure and prior to being lifted up to the nacelle need to be taken over by the nacelle crane 5. Usually, for conducting this transfer step from the vessel crane 6 to the nacelle crane 5 the component 1 would be set down on a WTG platform 7, be detached from the rigging of the vessel crane 6 and subsequently be attached to the rigging of the nacelle crane 5. However, the use of a handshake-tool 10 (shown in FIGS. 2 and 2*a* in greater detail), makes it possible to more easily hand over the component 1 from one crane to the other via a handshake procedure. Setting down the component on the WTG service platform 7 is not required and in the example shown in FIG. 1 the component can be handed over from the vessel crane 6 to the nacelle crane 5 once the component has been lifted into a transfer position in which the handshake-tool may be attached to the rigging of the nacelle crane 5 via a free second load engagement structure. In the exemplary embodiment shown in FIG. 2 the second load engagement structure is a sling 13 which can effectively be reached and attached to the rigging of the nacelle crane 5 (e.g., by a worker on the platform using a pike pole and grabbing the sling 13).

It should be noted that in FIG. 1 the "direction" of transportation of the component is from the vessel to the up-tower location of the WTG such that the vessel crane 6 serves as primary lifting apparatus (the lifting apparatus handing over the load of the component to the secondary lifting apparatus) and the nacelle crane 5 serves as secondary lifting apparatus (the lifting apparatus taking over the load of the component from the primary lifting apparatus).

FIG. 2 shows the handshake-tool 10 also depicted in FIG. 1 in detail. The handshake-tool comprises a load plate 11 as triangular shaped and plate like load-transmitting structure. Of course, other forms and types of load-transmitting structures serving the intended purpose, e.g., heavy metal rings or structures similar to chain links, may be used as well. Attached to the three corners of the load plate are three load engagement structures 12, 13 and 14 which each engage with the load plate at respective load points $12_1$, $13_1$ and $14_1$.

In the exemplary embodiment shown in FIG. 2 the handshake-tool 10 includes a remote shackle 12 as a first load engagement structure to which the vessel crane 6 as primary lifting apparatus is attached during the handshake procedure. The remote shackle 12 incorporates a remotely activatable release mechanism 16. A second load engagement structure to which the nacelle crane 5 is attached as secondary lifting apparatus includes a sling 13. A third load engagement structure to which the component 1 may be attached includes a pair of slings 14. Depending on the weight and sizes of the components to be attached to the handshake-tool and depending on the type of rigging used on the service vessel bound and WTG bound apparatus other types of load engagement structures may be used alternatively or in addition to the load engagement structures shown in FIG. 2.

FIG. 2a shows the remote shackle 12 of FIG. 2 in greater detail. The remote shackle 12 includes a radio-controlled release mechanism 16 which can be activated remotely by a remote control 17. The release mechanism comprises a bolt 16' as engagement element which can be placed in an advanced position, in which the remote shackle is closed and in a secure engagement with a part to which the shackle is connected (e.g., load plate 11 or a rigging of a lifting apparatus), or in a retracted position, in which the shackle is opened and the mentioned engagement is released.

The remote shackle 12 further includes a load sensing mechanism 15. This load sensing mechanism senses the load acting on the remote shackle 12 and depending on the detected load it will allow the activation of the release mechanism 16 only if the load acting on the remote shackle is below a predefined release threshold. The remote shackle 12 also includes a battery 18 which serves as energized system to provide energy for the release mechanism 16 which may, for example, include an electromagnetic actuator 16".

Figure 3:
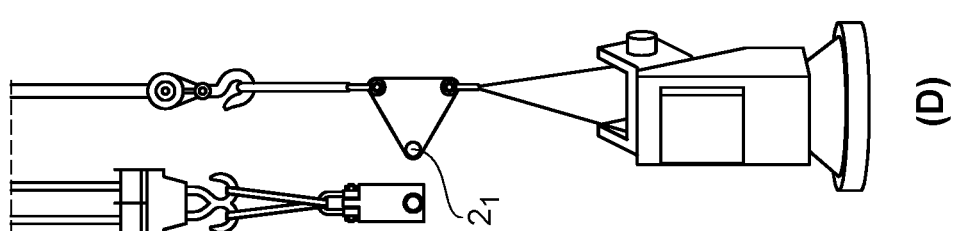
Figure 3:
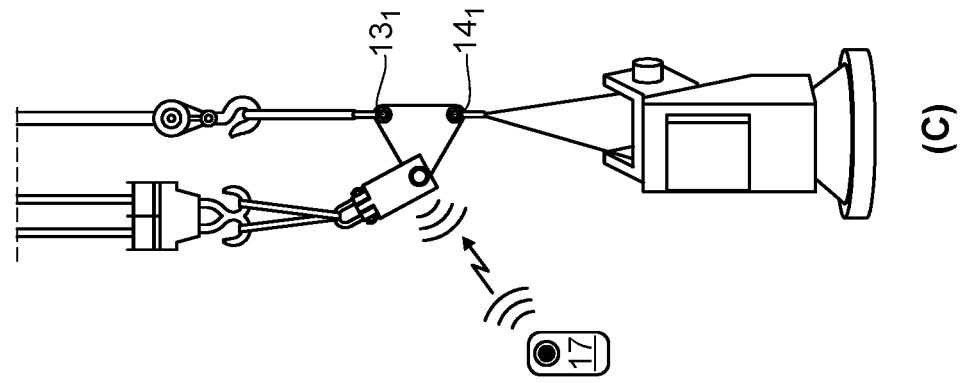
Figure 3:
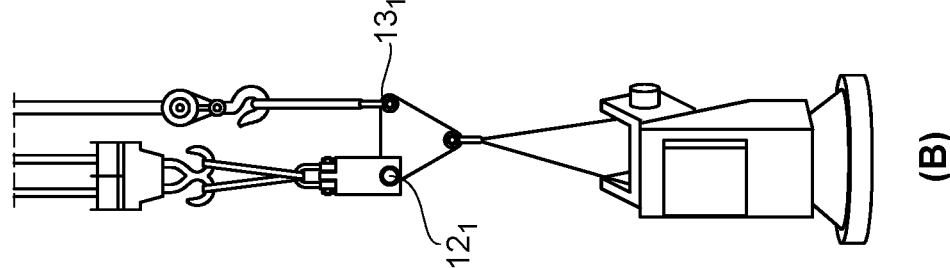
Figure 3:
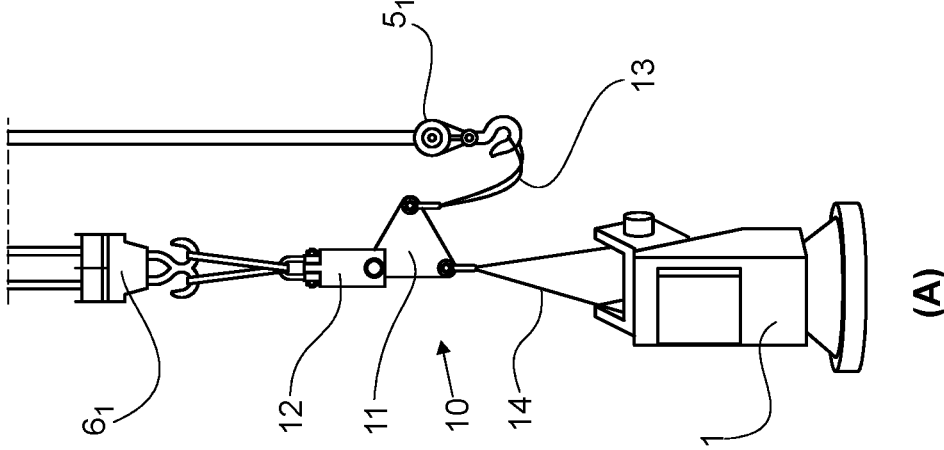
Figure 4:
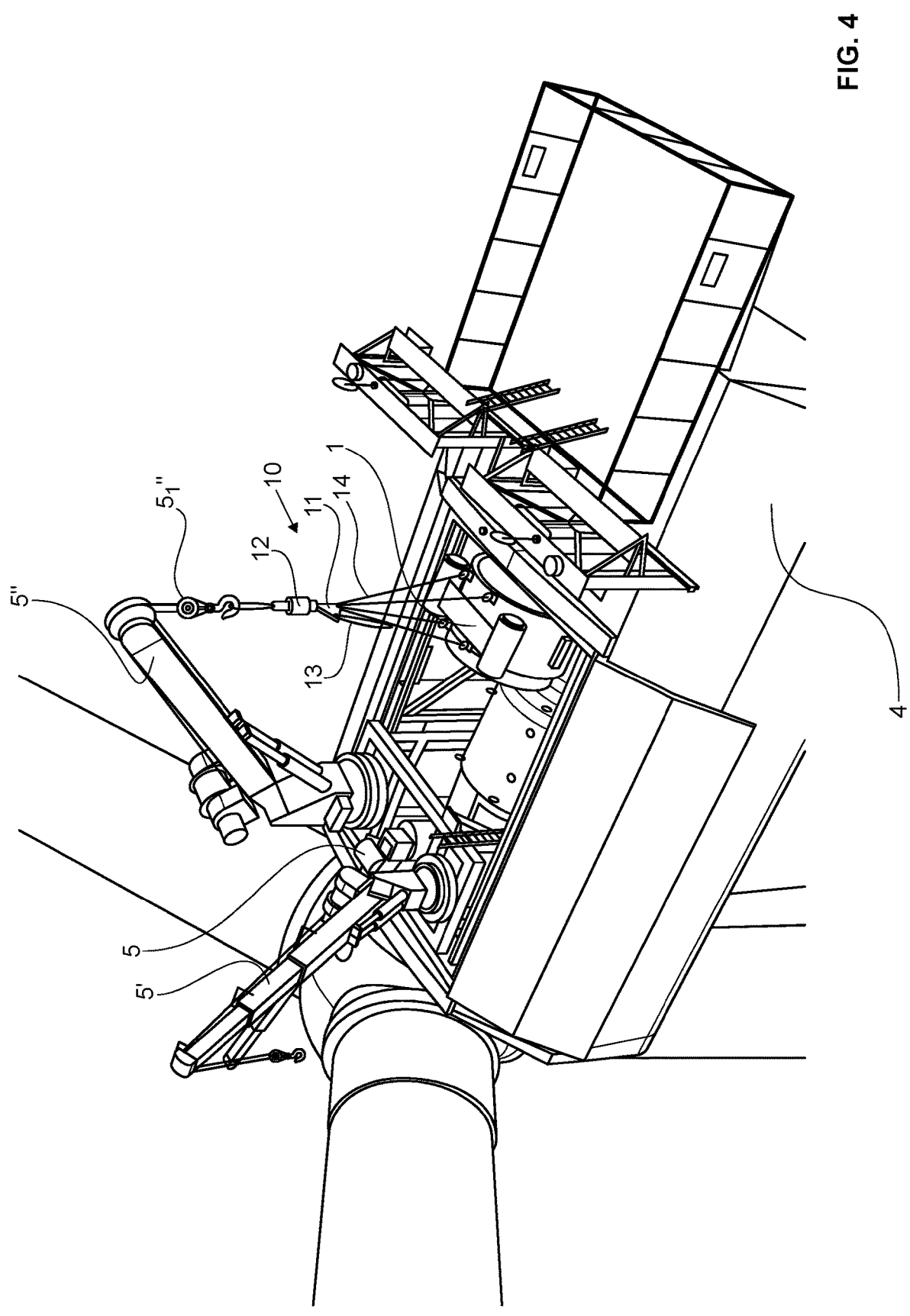

FIG. 3 shows a sequence of different stages (A) to (D) of the handshake procedure as described above between the vessel crane 6 as primary lifting apparatus and the nacelle crane 5 as secondary lifting apparatus.

In stage (A) the component 1, in this case a base for the additional temporary crane 5' shown in FIG. 4, is—via handshake tool 10 and remote shackle 12—attached to the rigging $6_1$ of the vessel crane 6. Sling 13—being the second engagement structure—is brought into engagement with a hook that is forming part of the rigging $5_1$ of the WTG bound nacelle crane 5.

In stage (B) the hook of the nacelle crane rigging has begun to be lifted further (and/or the rigging $6_1$ of the vessel crane 6 has begun to be lowered further) and the load plate 11 starts to turn counterclockwise around its center axis. In stage (B) the component's load is shared by both the vessel crane 6 and the nacelle crane 5 more or less equally as can be seen by the horizontal orientation of the upper edge of the triangular load plate 11 which is between a first load point $12_1$ to which the first engagement structure 12 is connected to and a second load point $13_1$ to which the second load engagement structure is connected to. In this stage the load sensing mechanism which is incorporated in the remote shackle does not yet allow the release mechanism to be opened since a too high load is still detected.

In stage (C) the hook of the nacelle crane rigging $5_1$ has been raised further (or the double hook being part of the vessel crane rigging $6_1$ has been lowered further) and the weight of the component 1 has now been handed over to the nacelle crane. The triangular shaped load plate 11 has turned into its end orientation in which the line of action of the weight force of the component 1 is in line with the load points $13_1$ and $14_1$ connected to the second and third engagement structure 13 and 14, respectively. This turning of the load plate is—in addition to the fact that the remote shackle 12 is starting to tilt due to its own weight—is a good visual indication for a worker that the weight of the component has been handed over from the vessel crane to the nacelle crane. Now the load sensing mechanism does not sense a load any more that would be too high to allow for the remote activation of the release mechanism such that by using a remote 17 the release mechanism can be activated and the remote shackle may be opened.

Finally, in stage (D) the release mechanism incorporated in the remote shackle 12 has been remotely activated, the remote shackle loses its engagement with load plate 11 at load point $12_1$ and separates from the load plate 11. The component is now fully and solely attached to the rigging $5_1$ of the nacelle crane and can be lifted to its up-tower destination on the nacelle. The remote shackle can be brought back onto the vessel and by attaching another load plate with the needed engagement structures to the remote shackle another handshake-tool can be completed for lifting a next component to the nacelle.

FIG. 4 depicts a situation after a first additional temporary nacelle crane 5' and a second additional temporary nacelle crane 5" with a high load capacity have been temporarily installed on the nacelle 4. In this exemplary embodiment a generator with a weight of about 30 tons is to be lowered to the service vessel by means of the additional temporary nacelle crane 5" and the vessel crane 6 shown in FIG. 1. This requires the component 1 (the generator) to be handed over from nacelle crane 5" to vessel crane 6 at some point during the procedure.

Figure 5:
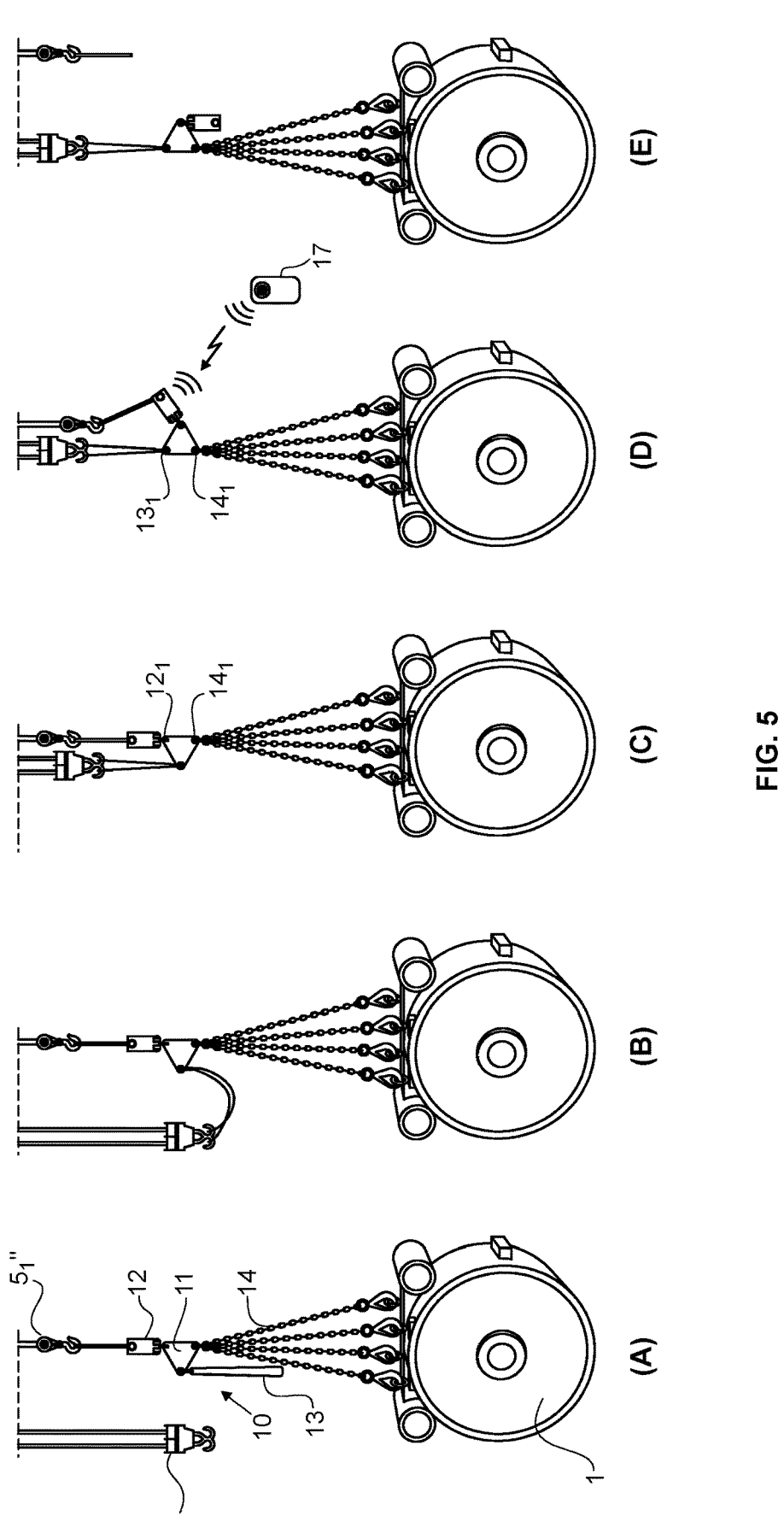

It should be noted that in the procedure to which FIG. 4 refers the "direction" of transportation of the component is from the up-tower location of the WTG to the service vessel such that the temporary nacelle crane 5" serves as primary lifting apparatus (the lifting apparatus handing over the load of the component to the secondary lifting apparatus) and the vessel crane 6 serves as secondary lifting apparatus (the lifting apparatus taking over the load of the component from the primary lifting apparatus). In FIG. 5 this handshake procedure is shown in different stages (A) to (E).

In stage (A) the component is attached to the rigging $5_1"$ of the additional temporary nacelle crane 5" shown in FIG. 4 and has been brought into a transfer position in which a second load engagement structure (sling 13) connected to second load point $13_1$ of the load plate 11 can be attached to the rigging $6_1$ of the vessel crane as it is shown in stage (B). In stage (C) the load is still acting on the rigging $5_1"$ as can be seen by the orientation of the load plate 11 which shows that the line of action of the component's weight force is in line with the first and third load points $12_1$ and $14_1$. Further lifting the rigging $6_1$ of the vessel crane (and/or further lowering of the rigging $5_1"$ of the temporary nacelle crane 5") leads to the load being transferred to the vessel crane 6. Again, the turning of the load plate is a clear indication that the load has shifted from the first load point $12_1$ to the second load point $13_1$. Once the load has been transferred and the load sensing mechanism allows for a remote activation of the release mechanism the remote shackle may be opened. In this case and differing from the procedure shown in FIG. 3 the remote shackle 15 will remain on the handshake-tool such that the handshake-tool is brought to the vessel together with the remote shackle which can then be used on the vessel for attaching the replacement part to the vessel crane 6.

All Figures described above show that for lifting or lowering a component from to or from a WTG the use of large jack-up vessels that can reach the top of a nacelle of an off-shore WTG can be avoided by making use of a hand-shake-tool allowing the easy transfer of the component from one crane to the other. Such a procedure can save a significant amount of costs and fees for the operation and rent of an otherwise needed large jack-up vessel capable of reaching as far up as the nacelle.

The handshake-tool can be characterized in that the first load engagement structure and/or the second load engagement structure comprises a sling.

While the present invention has been illustrated by the description of one or more embodiments thereof, and while the one or more embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific detail and illustrative examples shown and described. Accordingly, departures may be made from such details without departing from the scope of the general inventive concept.

LIST FOR REFERENCE NUMERALS

1 Component
2 Service Vessel
3 Wind Turbine Generator
4 Nacelle
5 permanently installed nacelle crane (low load capacity)
5', 5" temporarily installed nacelle crane (higher load capacity)
$5_1$, $5_1$" Rigging of WTG bound cranes 5, 5"
6 Vessel crane
$6_1$ Rigging of vessel bound crane
7 WTG platform
10 Handshake-Tool
11 Load plate
12 Remote shackle (first load engagement structure)
$12_1$ First load point
13 Sling (second load engagement structure)
$13_1$ Second load point
14 Pair of slings or chains (third load engagement structure)
$14_1$ Third load point
15 Load sensing mechanism
16 Remotely activatable release mechanism
16' Bolt (engagement element)
16" Actuator
17 Remote control
18 Battery

The invention claimed is:

1. A method for lifting components from a location on a service vessel to a location on an off-shore wind turbine generator and/or for lowering components from a location on the off-shore wind turbine generator to a location on the service vessel, the method making use of at least a service vessel bound lifting apparatus and a wind turbine generator bound lifting apparatus and including a transfer step during which the component is detached from the one of the lifting apparatuses being a primary lifting apparatus and is attached the other one of the lifting apparatuses being a secondary lifting apparatus, the method comprising:

providing a handshake-tool including:
    a plate like load-transmitting structure; and
    a first load engagement structure coupled to the plate like load-transmitting structure and having a remotely activatable release mechanism, wherein the release mechanism includes a bolt and an electromagnetic actuator operatively coupled to the bolt and configured to selectively move the bolt between an advanced position and a released position relative to the plate like load-transmitting structure;

attaching a rigging of the primary lifting apparatus to the first load engagement structure wherein the bolt is in the advanced position;

attaching the component to the plate like load-transmitting structure;

lifting or lowering the component into a transfer position in which the component can be reached by a rigging of the secondary lifting apparatus; and performing the transfer step, by attaching the component to the rigging of the secondary lifting apparatus via the plate like load-transmitting structure prior to the component being detached from the primary lifting apparatus.

2. The method according to claim 1, wherein the component is not detached from the primary lifting apparatus prior to the load of the component having been taken over by the secondary lifting apparatus at least up to a release threshold.

3. The method according to claim 1, wherein during the transfer step the remotely activatable release mechanism is activated to move the bolt from the advanced position to the released position to release the component from the primary lifting apparatus.

4. The method according to claim 3, wherein the rigging of the primary lifting apparatus, the handshake-tool, or a part into which the remotely activatable release mechanism is incorporated in includes a load sensing mechanism allowing the activation of the remotely activatable release mechanism only if the load detected by the load sensing mechanism is below a release threshold.

5. The method according to claim 3, wherein the remotely activatable release mechanism is radio controlled.

6. The method according to claim 3, wherein a part in which the remotely activatable release mechanism is incorporated in, the handshake-tool, or the rigging of the primary lifting apparatus includes an energized system for providing the energy needed for the electromagnetic actuator to release the component from the primary lifting apparatus.

7. The method according to claim 3, wherein a part incorporating the remotely activatable release mechanism remains on the plate like load-transmitting structure of the handshake-tool after having been activated for releasing the component from the primary lifting apparatus.

8. The method according to claim 1, wherein the transfer step is completed without the component being set down onto a structure of the off-shore wind turbine generator.

9. The method according to claim 1, wherein the wind turbine generator bound lifting apparatus is a crane or winch installed on or inside a structure of a nacelle of the wind turbine generator and/or that the service vessel bound lifting apparatus is a vessel crane.

10. The method according to claim 1, wherein the plate like load-transmitting structure includes at least three load points with the at least three load points being in engagement with either the first, a second, or a third load engagement structure.

11. A handshake-tool for the use in a method according to claim 1, the handshake-tool comprising:

a plate like load-transmitting structure;

a first load engagement structure having a remotely activatable release mechanism, wherein the release mechanism includes a bolt and an electromagnetic actuator operatively coupled to the bolt and configured to selectively move the bolt between an advanced position and a released position relative to the plate like load-transmitting structure, wherein the primary lifting apparatus may be attached to the first load engagement structure; 5 a second load engagement structure to which the secondary lifting apparatus may be attached; and a third load engagement structure to which the component may be attached, 10 wherein when the bolt is in the advanced position the release mechanism is connected to the plate like load-transmitting structure and when the bolt is in the released position, the release mechanism in released from the plate like load-transmitting structure. 15

12. The handshake-tool according to claim 11, wherein the plate like load-transmitting structure includes a first load point for being in engagement with the first engagement structure, a second load point for being in engagement with the second engagement structure, and a third load point for 20 being in engagement with the third load engagement structure.

13. The handshake-tool according to claim 12, wherein the plate like load-transmitting structure includes a substantially triangular load plate with the first, second and third 25 load point each being near a corner of the load plate.

* * * * *